United States Patent [19]
Moore

[11] Patent Number: 5,463,203
[45] Date of Patent: Oct. 31, 1995

[54] VEHICLE HEATER

[76] Inventor: John R. Moore, 713 Benton Ave., El Dorado, Kans. 67042

[21] Appl. No.: 75,388

[22] Filed: Jun. 14, 1993

[51] Int. Cl.$^6$ ................................................. H05B 1/02
[52] U.S. Cl. ............................ 219/202; 392/368; 392/374
[58] Field of Search ................................. 219/202, 203; 392/365, 368, 373, 374

[56] References Cited

U.S. PATENT DOCUMENTS

| | | | |
|---|---|---|---|
| 3,870,855 | 3/1975 | Edlund | 219/202 |
| 4,267,433 | 5/1981 | Sahm | 219/203 |
| 4,280,330 | 7/1981 | Harris | 219/202 |
| 4,520,258 | 5/1985 | Grohmann | 219/202 |
| 4,874,921 | 10/1989 | Gerbig | 219/202 |
| 4,904,844 | 2/1990 | Chamberlin | 219/203 |
| 4,965,432 | 10/1990 | Harris | 219/203 |
| 5,025,130 | 6/1991 | Slone | 219/203 |
| 5,187,350 | 2/1993 | Tsuchiya | 219/203 |

*Primary Examiner*—Teresa J. Walberg

[57] ABSTRACT

A vehicle heater adapted to be plugged into a conventional car cigarette lighter. The vehicle heater includes an adapter for plugging the invention into a cigarette lighter, a switch for turning the heater on, a clock for setting a timer to turn the heater on at certain times and indicator lights for indicating when the unit is turned on when the battery power is low and when the air temperature is too high. The heater contains conventional heating elements and can be used in connection with any car cigarette lighter socket.

7 Claims, 5 Drawing Sheets

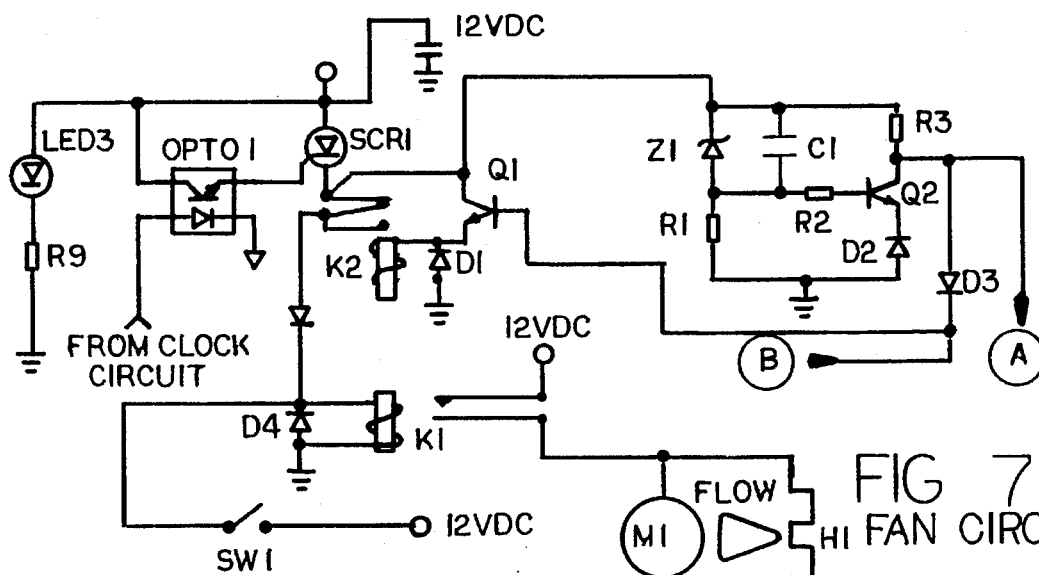
FIG 7A
BATTERY SENSOR
FIG 7B
FAN CIRCUIT
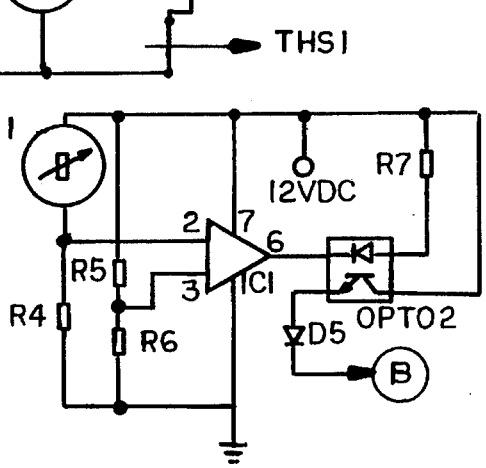
FIG 7C
LATCHING INDICATORS
FIG 7D
TEMPERATURE SENSOR

VEHICLE HEATER

BACKGROUND OF THE INVENTION

1. Field of the Invention

The present invention relates generally to heating units, and more particularly, to a heating unit adapted for use in a car and able to operate prior to starting the car.

2. Background of the Invention

Heating units generally are well known. For example, U.S. Pat. No. 4,350,287 dated Sep. 21, 1982, discloses a remote control car heater which removes power from the electrical heater once the automobile is started. U.S. Pat. No. 4,513,196 dated Apr. 23, 1985, discloses an electrically heatable self-defrosting windshield having two low resistance groups of wires and at least one high resistance group of wires embedded in the windshield. U.S. Pat. No. 5,057,666 dated Oct. 15, 1991, discusses an anti-frost system for a windshield which is incorporated into the windshield. U.S. Pat. No. 5,029,662, dated Jul. 9, 1991, discloses a remote starting apparatus which facilitates the starting of the vehicle from a remote location. Finally, U.S. Pat. No. 4,904,844, discloses a remotely operated vehicle windshield defrost system which may be activated before the driver enters the vehicle. A need exists, though, for a heating unit which may be programmed to defrost the front and rear windshields prior to the driver entering the vehicle and may be used to keep the driver's and passenger's feet and legs warm once they enter the car. A further need exists for a vehicle heater which will warm the car battery prior to use and thus aiding in starting the car.

The vehicle heater of the present invention provides ice-free windshields during cold winter :months as well as warming feet or acting as a rear glass de-icer.

This unit gives car owners the luxury of clear windshields without having to be within the vehicle, waiting for the engine to heat and provide warm air in order to defrost the glass.

Vehicle batteries are at their maximum power supplying potential at approximately 70 degrees Fahrenheit. When batteries are subject to the extremes of heat and cold, this potential lowers. The vehicle heater of the present invention prepares the +12VDC source of the vehicle for starting a cold engine. Since the unit is remotely or automatically activated, it is drawing current from and thus, exciting and warming the car battery before the driver's entry into the vehicle. Hence, by disengaging the unit prior to starting the vehicle, the battery is at a higher potential condition for ignition.

All heating units plug directly into a standard cigarette lighter socket and contain battery monitoring circuitry to disable the unit before impairing the battery's ability to start the vehicle. The present vehicle heater provides approximately 180 Watts/600 BTUs from a +12VDC source with a current draw of about 13 Amperes. The heaters also contain a safety limit switch for the heating element as well as temperature sensing circuitry to disable the unit if the environmental conditions outside cannot support the formation of ice upon the exterior of the viewing surfaces.

The present invention currently has five design concept structures:

1. Remote controlled unit with battery sensor.
2. Automated (time controlled) with battery and temperature sensors.
3. Self-adhesive heating tape grid permanently fixed to interior glass surface (Auto or remote activation).
4. Self-adhesive heating tape grid fixed to folding sun visor type structure (Auto or Remote activation).
5. Heating element with safety limit switch mounted in an enclosure also containing activation circuitry (Auto or Remote activation).

The most practical units for production are the remotely controlled and automated versions with self-contained heating element. This observation is based upon cost per unit, ease of operation and incorporation, volume of vehicle interior occupation, packaging volume, and durability.

With the characteristics mentioned above in mind, the best of the five concepts is a combination of automated circuitry and heating element in an enclosure also containing battery and temperature sensing circuitry for deactivation.

The automated unit will be of the most concern and focus within the following documentation.

SUMMARY OF THE INVENTION

To achieve the foregoing and other advantages, the present invention, briefly described, provides a vehicle heater adapted to be plugged into a conventional car cigarette lighter. The vehicle heater includes an adapter for plugging the invention into a cigarette lighter, a switch for turning the heater on, a clock for setting a timer to turn the heater on at certain times and indicator lights for indicating when the unit is turned on when the battery power is low and when the air temperature is too high. The heater contains conventional heating elements and can be used in connection with any car cigarette lighter socket.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefor an object of the present invention to provide a new and improved vehicle heater which has all of the advantages of the prior art and none of the disadvantages.

It is another object of the present invention to provide a new and improved vehicle heater which may be easily and efficiently manufactured and marketed.

It is a further object of the present invention to provide a new and improved vehicle heater which is of durable and reliable construction.

Still yet a further object of the present invention is to provide a new and improved vehicle heater which includes a timer for activating the heater to defrost or de-ice windshields prior to entering or starting the vehicle.

It is still a further object of the present invention to provide a new and improved vehicle heater which both deices and defrosts windshields and warms the legs and feet of the driver and passengers.

Still a further object of the present invention is to provide a new and improved vehicle heater including means for monitoring the heater from draining the battery too low and to prevent operation if outside temperatures are not low enough.

An even further object of the present invention is to provide a new and improved vehicle heater which plugs into a vehicle's cigarette lighter.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 7A is a schematic diagram of the battery sensor.

FIG. 7B is a schematic diagram of the fan circuit.

FIG. 7C is a schematic diagram of the latching indicators.

FIG. 7D is a schematic diagram of the temperature sensor.

DESCRIPTION OF THE PREFERRED EMBODIMENT

Figure 1:
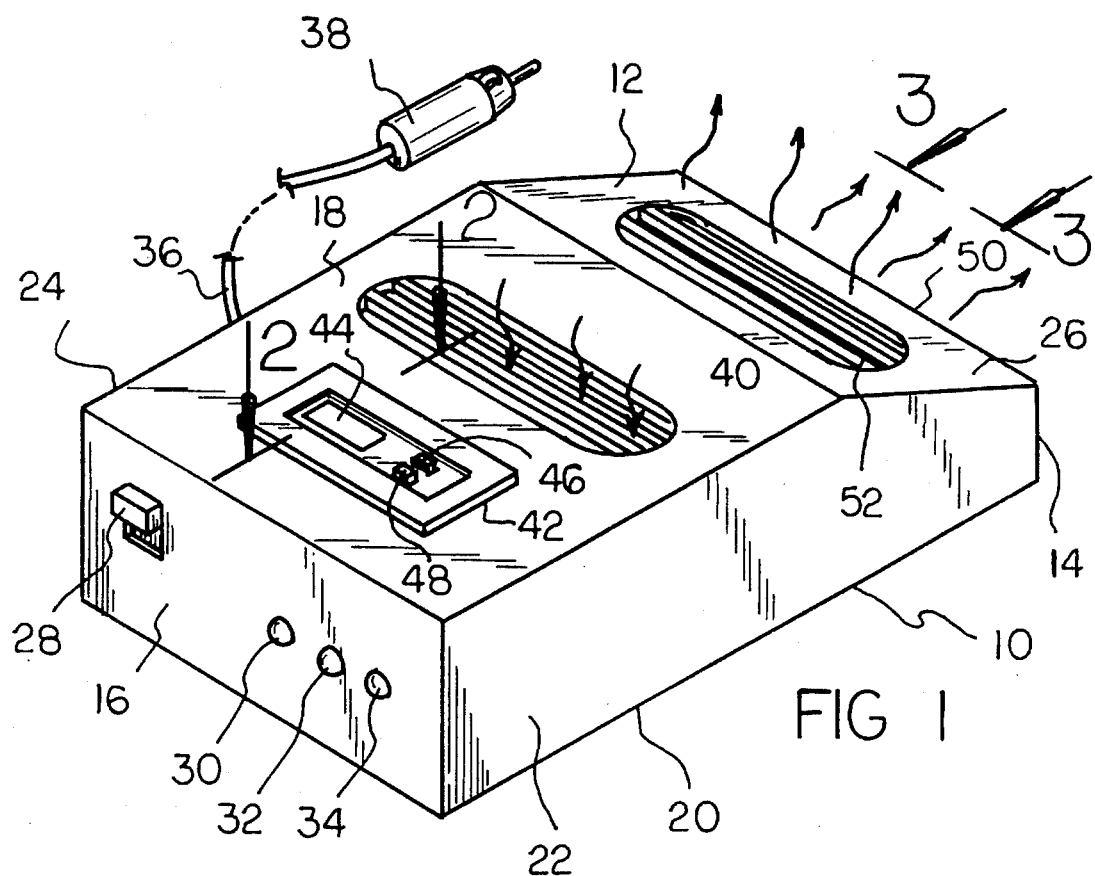
FIG. 1 is an elevational rear view of the preferred embodiment of the vehicle heater of the present invention.
Figure 2:
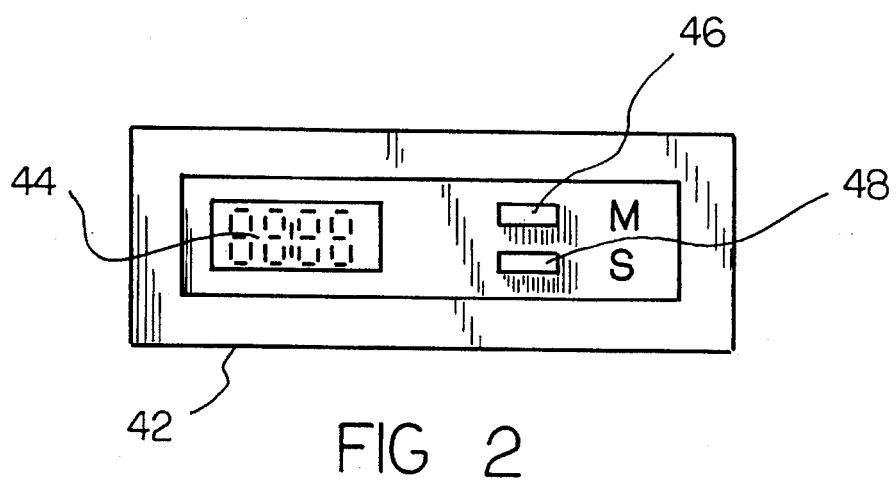
FIG. 2 is an illustration of the clock of the invention.
Figure 3:
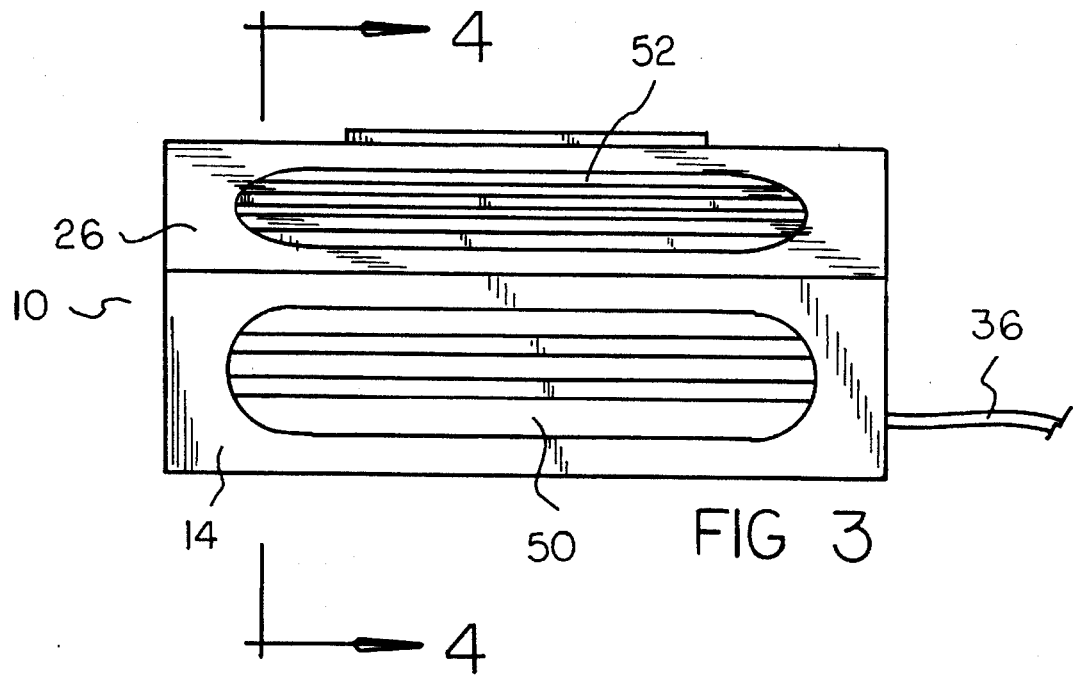
FIG. 3 is a front view of the vehicle heater of the present invention.

With reference now to the drawings, a new and improved vehicle heater embodying the principles and concepts of the present invention will be described.

Turning initially to FIGS. 1 to 5, there is shown an exemplary embodiment of the vehicle heater of the invention generally designated by reference numeral 10. In its preferred form, the vehicle heater 10 comprises generally housing 12 having front and rear opposed walls 14 and 16; top and bottom opposed walls 18 and 20; right and left opposed sides 22 and 24; and a diagonal wall 26 connected between the front and top walls 14 and 18, respectively. Within the rear wall 16 of the housing is a switch 28 for turning the heater on and off and indicator lights 30, 32 and 34. Indicator light 30 is lighted when the supply battery exists in or acquires a low potential state. Indicator light 32 is lighted when the heater energizes over the required temperature. Indicator light 34 is lighted when the switch 28 is turned to the on position.

A power cord 36 extends from the left wall 24. Attached to the power cord 36 is an adapter 38. The adapter 38 is for plugging into the cigarette lighter in a car. A car cigarette lighter is well known and the details of same form no part of the present invention.

On the top side 18 of the housing 12 is an air input grate 40 for receiving air pulled into the housing 12. Also, within the top side 18 is a timer clock 42. The timer clock 42 has an LED display 44, a mode switch 46 for setting the mode of operation of the clock 42, either turning the timer on or off, and a set switch 48 for setting the correct time and the time at which the heater should turn on.

Both the front side 14 and the diagonal side 26 have output grates 50 and 52, respectively. The heat generated by the heater is output through these grates.

Figure 4:
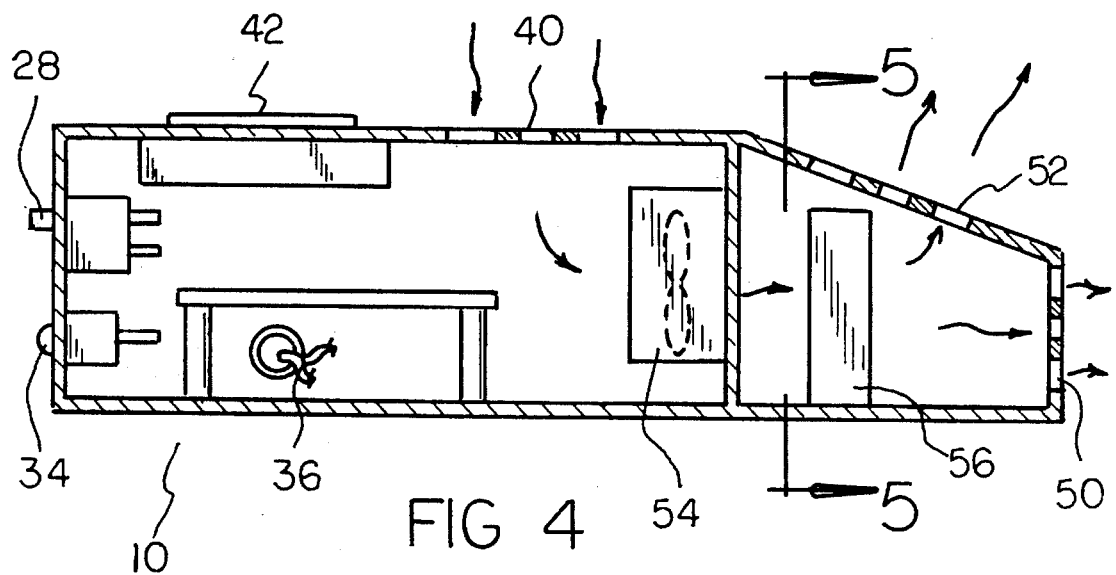
FIG. 4 is a cross-sectional view taken along line 4—4 of FIG. 3.
Figure 5:
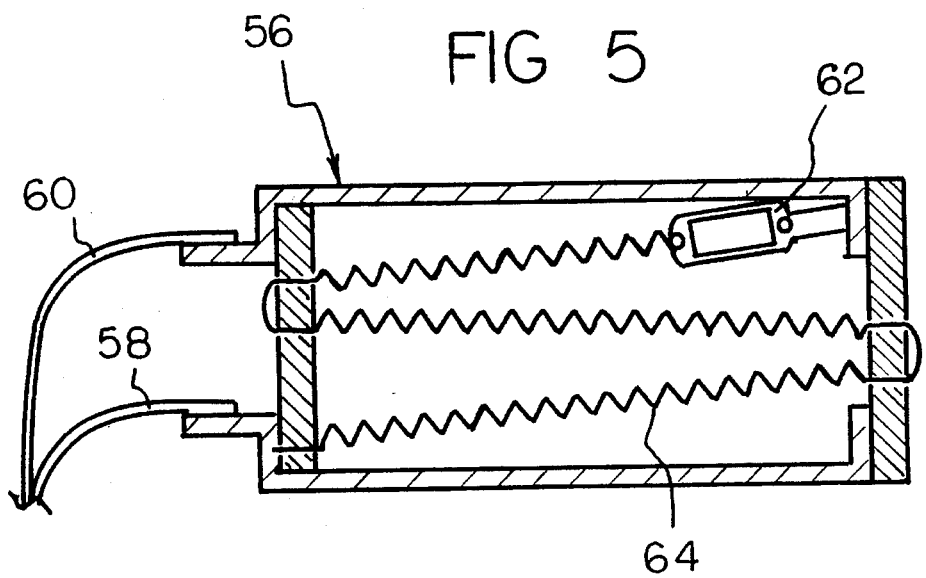
FIG. 5 is a cross-sectional view taken along line 5—5 of FIG. 4.

Within the housing, as shown in FIGS. 4 and 5, are a fan 54 for pulling air into the housing 12 through grate 40 and delivering this air to the heating element 56. The heating element 56 is powered by power supplied through wires 58 and 60. The voltage is supplied to the fuse 62 which heats the heating coil 64 to warm the air delivered by the fan 54.

Figure 6:
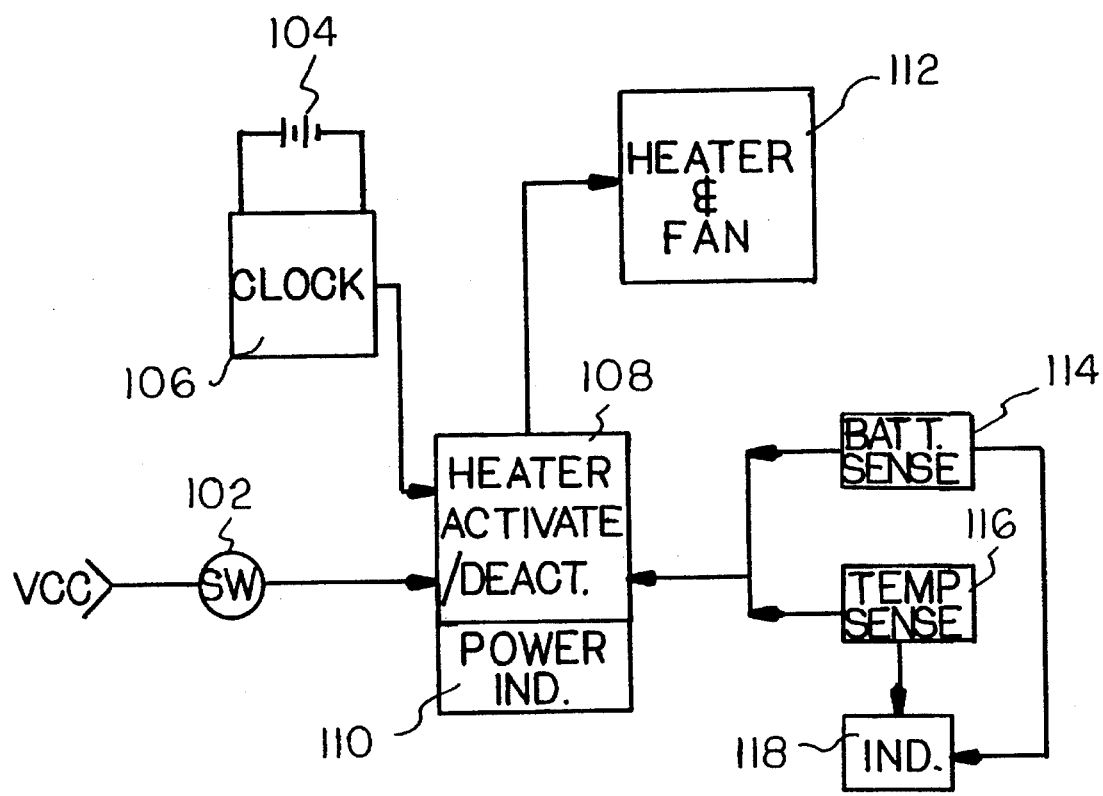
FIG. 6 is a block diagram of the vehicle heater of the present invention.

FIG. 6 is a block diagram of the vehicle heater of the present invention. The power is supplied to a heater activate/deactivate circuit 108 from the car battery, not shown, when a switch 102 is placed in the on position. Power is also supplied by a battery 104 within the housing when the clock 106 connects the battery 104 to the heater activate/deactivate circuit 108. When power is supplied to the heater activate/deactivate circuit 7108 the power indicator light 110 and the heater and fan circuit 112 are turned on. The battery sensor 114 and temperature sensor 116 constantly monitor the battery power of the internal battery 104 and car battery and the temperature of the outside air, respectively. When either the battery power gets too low or the temperature gets too high the sensors 114 or 116 supply power to switch on an indicator light 118 to inform the user of the problem.

Figure 8:
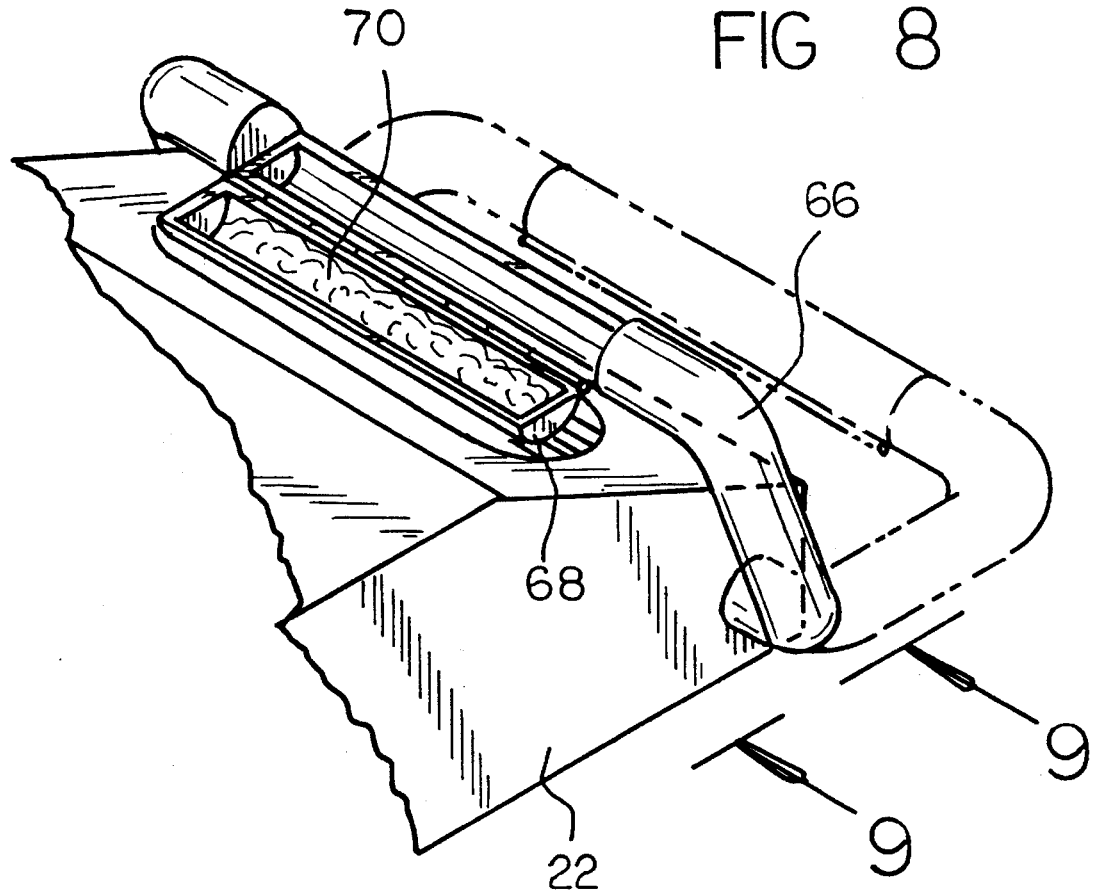
FIG. 8 is an elevational rear view of the handle of the present invention.
Figure 9:
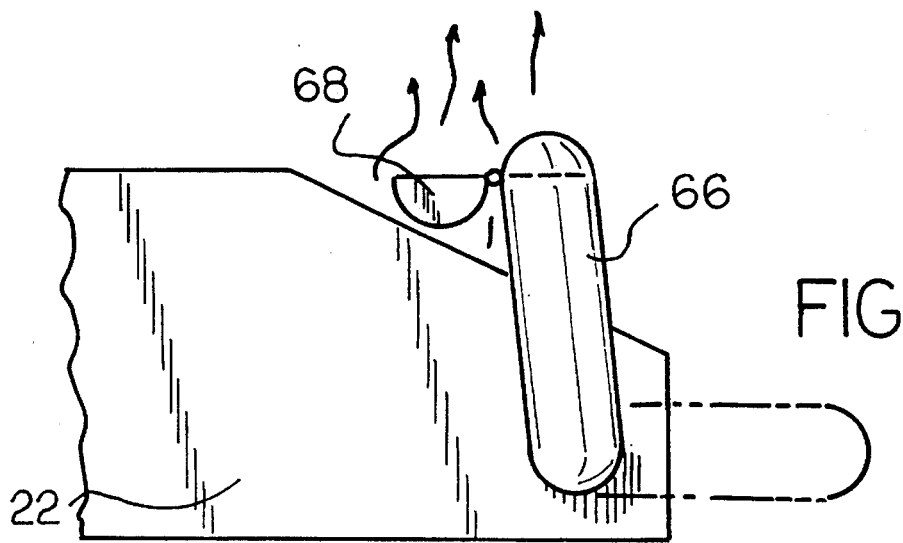
FIG. 9 is a side view of the handle of the present invention.

The housing 12 may also include a handle 66, as shown in FIGS. 8 and 9, attached to the left and right side walls 22 and 24. The handle 66 has a flip top 68. When the handle 66 is placed in a vertical position, the top 68 may be flipped open and potpourri may be stored there or incense may be burned inside.

The operation of the circuit will now be described with relation to FIGS. 7A to 7D.

In FIG. 7A, the Zener diode, Z1, has been chosen for the voltage below which an indication is required. Should the vehicle supply exists in or acquire a low potential state, Z1 will cease to conduct causing Q2 to shut off. The collector voltage of this transistor will then increase, placing a positive potential upon Q1, the K2 driver transistor, and the battery sensor indicator traic driver, Q3.

The potential upon the ready driver forward biases the transistor and energizes K2, causing the relay to interrupt current to the coil of K1. This action provides an incomplete current path for both the fan and heater, turning them off.

Once the current flow through SCR1 is disturbed, SCR1 goes into a non-conductive state and must be re-triggered before conducting again.

LED1 indicator is energized by the completed current path formed when traic Q5 is triggered. This gives the operator a visual indication of why the unit is not functioning.

The loading effect of the heater will drop an average +12VDC vehicle battery to +10.53VDC after thirty minutes of operating time, with the vehicle not running. Due to this loading effect, the Zener diode Z1 used is of a 10V level. An effective battery may be loaded down to a level of +9VDC when the vehicle starter is energized during pre-ignition. Loading below the +9VDC level when starting a vehicle is an indication of a weakened and inefficient battery.

FIG. 7B shows the operation of the fan M1. The fan M1 is connected between a 12 volt DC source and ground. When voltage is applied to the fan M1 it turns on and blows air to the heating unit shown in FIGS. 4 and 5. It also blows the air though a temperature sensor THS1.

FIG. 7C shows how the indicator lights operate. When a voltage is delivered to either/or transistors Q3 and Q4 which is large enough to turn the transistors on a voltage is delivered to either/or LED1 and LED2 indicating either the temperature is too high or the battery power is too low.

The temperature sense circuit shown in FIG. 7D is centered around a LM741 operational amplifier IC2. The op-amp, being used in this instance as an inverting comparator, is provided with a reference voltage (VREF), via the voltage divider network of R5 and R6. This potential is applied to pin #3 of IC1.

A second voltage divider network formed by R4 and a precision thermistor, TH1, provides the input voltage (VIN) to pin #2. This VIN on pin #2 is compared to the VREF at pin #3. When VIN exceeds VREF, the output at pine #6 is low. When VREF exceeds VIN, the output of IC1 switches from low to high, reverse biasing the infrared emitting diode of the opto-isolator OPTO2.

As the vehicle interior air temperature rises, the thermistor resistance lowers and, respectively, this action places an increasing potential upon pin #2 which is directly proportional to temperature increase.

Resistance values have been calculated to shut down the heater at temperatures above approximately forty degrees Fahrenheit, since no ice can form upon a windshield at this temperature. At temperatures above this level, VIN is greater than VREF and pin #6 goes from high to low.

A low potential at pin #6 causes the IR emitting diode of the above mentioned isolator OPTO2 to be forward biased which, in turn, allows the phototransistor output of this IC to conduct and place a +12VDC potential upon the over-temp indicator drive, Q4 and through diode D5 to relay driver Q1.

The positive potential at the K2 driver transistor causes the relay to energize and interrupt current flow to the coil of K1, deactivating the heater in the same manner as the battery sense circuitry. As well, the driver transistor for the indicator traic, Q4, is also biased into conduction. This triggers the traic, Q6, and energizes the over temp indicator, LED2.

With a +12VDC supply applied to pin #7 of the LM741, VREF is set to +4.36VDC and VIN is approximately +6.31VDC at seventy-two degrees Fahrenheit. Pin #6 low voltage level is approximately +2.91VDC and the high voltage level is approximately +11.42VDC.

The clock mechanism of this product is not approached at the component level but rather as a part, purchased from a vendor. The clock may be customized in later units by including dual timer alarms and low battery and temperature sense indicators placed, as symbols or abbreviations, upon the liquid crystal display. For the time being, and perhaps in the future, the clock mechanism should be manufactured by a separate, specialized firm for the producer of the heating unit. This will keep the heater manufacturing costs lower than if specialized equipment was purchased for timer production and engineering as well as simplifying the unit's production process. The increased cost per unit due to the outside purchase of the total clock mechanism would be insignificant when compared to the cost of equipment needed for clock circuitry production of this nature.

To be compatible with heater circuitry, a clock must meet the following characteristics:

1. Independent, 1.5VDC battery supply.
2. No hourly or half hour pulses; pulses only upon alarm activation.
3. Must meet physical size requirements restricted by heater enclosure.
4. Must have an alarm output of sufficient potential to forward bias the IR emitting diode of the heater circuitry opto-isolator.

The vehicle heater is also very easy to use. Set the timer on the clock to the desired time. Plug the power cord into the cigarette lighter and check the indicator light to make sure that the unit has power. Set the heater in a central location on the car's dashboard. When the windshield is defrosted, unplug the unit and place it on the seat or on the floor of the car. The clock has its own battery supply so that it can be unplugged without the operator having to reset it every time. When the operator arrives home, the vehicle heater can be plugged in and left on the dashboard. The next morning, it will automatically come on and defrost the windshield again. The vehicle heater can also be used to defrost the rear window.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from principles and concepts set forth herein. Hence, the proper scope of the present invention should be determined only by the broadest interpretation of the appended claims so as encompass all such modifications and equivalents.

What is claimed as being new and desired to be protected by LETTERS PATENT of the United States is as follows:

1. A vehicle heater adapted to be plugged into a cigarette lighter of a car, comprising:

an adapter able to be connected to a battery of the car through the cigarette lighter;

a heater and fan circuit;

a heater activator/deactivator circuit connected to the adapter for receiving voltage from the battery of the car heater and fan circuit for supplying voltage to the heater and fan circuit;

a switch, having an on and off position, connected to the heater activator/deactivator circuit for supplying voltage to the heater activator/deactivator circuit when the switch is in the on position;

a battery;

a clock connected between the battery and the heater activator/deactivator circuit;

a battery sensor connected to the heater activator/deactivator circuit for sensing the voltage level supplied to the heater activator/deactivator circuit;

a first indicator light connected to the battery sensor for indicating a low voltage is being supplied to the heater activator/deactivator circuit upon receipt of a signal from the battery sensor;

a temperature sensor connected to the heater activator/deactivator circuit for sensing outside air temperature;

a second indicator light connected to the temperature sensor for indicating when the temperature of the air is above a predetermined temperature upon receipt of a signal from the temperature sensor;

a third indicator light connected to the switch for indicating the switch is in the on position and the vehicle heater is operational upon receipt of a signal from the switch;

wherein the heater and fan circuit comprises a fuse for receiving voltage from the heater activator/deactivator circuit, and a heating coil connected to the fuse for receiving the voltage delivered to the fuse and heating air within the circuit upon receipt of the voltage.

2. The invention of claim 1, wherein the clock comprises a timer for setting a time in which the heater and fan circuit should be activated and forming a connection between the battery and the heater activator/deactivator circuit upon reaching the set time.

3. A vehicle heater adapted to be plugged into a cigarette lighter of a car, comprising:

an adapter for connecting to a cigarette lighter os a car;

a heater activator/deactivator circuit connected to the adapter for receiving voltage from a battery of the car;

a heater and fan circuit, the heater and fan circuit being in electrical communication with the heater activator/deactivator circuit and comprising a fuse for receiving voltage from the heater activator/deactivator circuit, and a heating coil connected to the fuse for receiving the voltage delivered to the fuse and heating air within the circuit upon receipt of the voltage;

a switch having an on and off position, the switch being connected to the heater activator/deactivator circuit for supplying voltage to the heater activator/deactivator circuit when the switch is in the on position;

a battery;

and, a clock connected between the battery and the heater activator/deactivator circuit.

4. The vehicle heater of claim 3, and further comprising:

a battery sensor connected to the heater activator/deactivator circuit for sensing the voltage level supplied to the heater activator/deactivator circuit.

5. The vehicle heater of claim 4, and further comprising:

a first indicator light connected to the battery sensor for indicating a low voltage is being supplied to the heater activator/deactivator circuit upon receipt of a signal from the battery sensor.

6. The vehicle heater of claim 5, and further comprising:

a temperature sensor connected to the heater activator/deactivator circuit for sensing outside air temperature;

and, a second indicator light connected to the temperature sensor for indicating when the temperature of the air is above a predetermined temperature upon receipt of a signal from the temperature sensor.

7. The vehicle heater of claim 6, and further comprising:

a third indicator light connected to the switch for indicating the switch is in the on position and the vehicle heater is operational upon receipt of a signal from the switch.

* * * * *